United States Patent
Mamaghani et al.

(10) Patent No.: US 7,788,373 B2
(45) Date of Patent: *Aug. 31, 2010

(54) SYSTEM AND METHOD FOR ADJUSTING THE TRAFFIC CARRIED BY A NETWORK

(75) Inventors: Farzan Mamaghani, Bothell, WA (US); Brian Daly, Issaquah, WA (US)

(73) Assignee: AT&T Mobility II, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/050,774

(22) Filed: Mar. 18, 2008

(65) Prior Publication Data

US 2008/0162694 A1    Jul. 3, 2008

Related U.S. Application Data

(63) Continuation of application No. 10/725,466, filed on Dec. 3, 2003, now Pat. No. 7,346,681, which is a continuation of application No. 09/489,152, filed on Jan. 21, 2000, now Pat. No. 6,675,211.

(51) Int. Cl.
*G06F 15/16* (2006.01)

(52) U.S. Cl. .................. 709/224; 709/203; 709/217; 709/219; 709/236

(58) Field of Classification Search ......... 709/200–203, 709/217–227, 230–235, 236
See application file for complete search history.

(56) References Cited

U.S. PATENT DOCUMENTS

| | | | |
|---|---|---|---|
| 5,115,429 A | 5/1992 | Hluchyj et al. | |
| 5,701,292 A | 12/1997 | Chiussi et al. | |
| 5,719,853 A | 2/1998 | Ikeda | |
| 5,793,416 A * | 8/1998 | Rostoker et al. | 348/14.13 |
| 5,905,711 A | 5/1999 | Chiussi et al. | |
| 5,926,483 A | 7/1999 | Javitt | |
| 6,021,116 A | 2/2000 | Chiussi et al. | |
| 6,052,734 A | 4/2000 | Ito et al. | |
| 6,081,843 A | 6/2000 | Kilkki et al. | |
| 6,084,857 A | 7/2000 | Takamichi | |
| 6,130,905 A | 10/2000 | Wakayama | |
| 6,154,778 A | 11/2000 | Koistinen et al. | |

(Continued)

OTHER PUBLICATIONS

"CDMA Air Interface Design," Chapter 5 and "Wideband CDMA Schemes," Chapter 6 in Wideband CDMA for Third Generation Mobile Communications, Tero Ojanpera and Ramjee Prasad, Eds., Artech House Publishers, Boston, MA (1998), pp. 101-193.

*Primary Examiner*—Moustafa M Meky

(57) ABSTRACT

A system and method for improving or maintaining the quality of service delivered by a network with respect to a preferred type of information carried by the network. The status of the network is monitored to determine if the actual or projected quality of service being provided by the network for the preferred information meets a quality of service requirement. If the quality of service does not meet the requirement, a message is formulated and sent to an end-user terminals such as a wireless handset. The message instructs the terminal to change a parameter by which the terminal sends information to the network. For example, the message can instruct the terminal to send less non-preferred information to the network, or change the compression scheme used to send a type of information to the network.

21 Claims, 2 Drawing Sheets

U.S. PATENT DOCUMENTS

| | | |
|---|---|---|
| 6,269,078 B1 | 7/2001 | Lakshman et al. |
| 6,278,693 B1 | 8/2001 | Aldred et al. |
| 6,282,172 B1 | 8/2001 | Robles et al. |
| 6,292,834 B1 | 9/2001 | Ravi et al. |
| 6,307,866 B1 | 10/2001 | Hayter |
| 6,414,939 B1 | 7/2002 | Yamato |
| 6,418,150 B1 | 7/2002 | Staats |
| 6,442,138 B1 | 8/2002 | Yin et al. |
| 6,469,991 B1 | 10/2002 | Chuah |
| 6,510,165 B1 | 1/2003 | Uriu et al. |
| 6,600,737 B1 | 7/2003 | Lai et al. |
| 6,675,211 B1 * | 1/2004 | Mamaghani et al. ........ 709/224 |
| 6,714,517 B1 | 3/2004 | Fawaz et al. |
| 6,882,624 B1 | 4/2005 | Ma |
| 7,307,980 B1 * | 12/2007 | Shah ......................... 370/352 |
| 7,346,681 B2 | 3/2008 | Mamaghani et al. |

* cited by examiner

SYSTEM AND METHOD FOR ADJUSTING THE TRAFFIC CARRIED BY A NETWORK

BACKGROUND OF THE INVENTION

The quality of service requirements for different types of information carried by a network are often themselves different. For example, it can be more important to limit the latency (the delay between the time a signal is sent and the time it is received) and the error rate for voice information (e.g., conversations) carried by a network than for a file transfer carried by the same network. Even short delays in voice conversations lead to confusion because they can cause one party to mistakenly believe that the other party is finished speaking. This can cause one party to talk over the words of another party. Short delays in file transfers are typically not noticed. Likewise, a high error rate in voice conversations can render a party's words incomprehensible. A high error rate in file transfers is typically handled without too much inconvenience using known error detection and correction protocols, and retransmissions.

A network typically has a finite capacity to carry information at a given quality of service. Thus, meeting stringent quality of service requirements for one type of information can mean limiting the amount of other information carried by the network, or reducing the quality of service with which the other information is carried. One known scheme for carrying this out is the H.323 standard. The H.323 standard specifies gateways interposed between end-user terminals on a network. The gateways act as "traffic cops," monitoring the state of the network and quality of service requirements, and deciding what information an end-user terminal can send and receive, and by what parameters (e.g., rate, protocol, etc.) An H.323 gateway negotiates with another H.323 gateway to determine the parameters for a communication between end-user terminals represented by each gateway. This communication is typically performed on a link-by-link basis (e.g., it is performed for each new communication between two or more end-users), and disadvantageously generates network traffic that can additionally burden a network. Further, a H.323 gateway's end-user terminals have no real control over the parameters of a communication, as these are dictated by the gateway.

Another known system involves direct negotiations between endpoints to determine the parameters of a communication. Again, this is performed on a link-by-link basis, and can generate substantial amounts of network traffic when performed on a large scale (between many endpoints at once).

Yet another known system employs a gateway that monitors the status of the network and then acts as a filter between the gateway's end-user terminals and the network, deciding what to pass on to the network and what to defer or drop, based upon the network's status (e.g., based upon the level of congestion of the network). The use of a gateway is expensive and adds an additional layer of complexity to network topology.

A better system would assure quality of service for a particular type of information carried by a network without generating the substantial overhead traffic involved in two-way negotiations over communications parameters on a link-by-link basis,and avoid the expense and added complexity incurred by using gateways between the network and the end-user terminals.

SUMMARY OF THE INVENTION

An embodiment of the present invention provides a system and method for improving or maintaining the quality of service delivered by a network with respect to a first type (e.g., a preferred type) of information carried by the network. The status of the network is monitored to determine if the actual or projected quality of service being provided byte network for the first type of information meets a quality of service requirement. If the quality of service does not meet the requirement, a message is formulated and sent to an end-user terminal, such as a wireless handset. The message instructs the terminal to change the character of the information the terminal sends to the network. For example, the message can instruct the terminal to send less of a second type (e.g., a non-preferred type) of information to the network, or change the compression scheme used to send any of the various types of information to the network.

DETAILED DESCRIPTION

In accordance with an embodiment of the present invention, the quality of service provided by a network with respect to a first type (e.g., a preferred type) of information is assured by directly regulating the character of information sent by end-user terminals to the network. As used herein, the "character of information" means any aspect of information that is sent from the end-user terminal to the network. For example, the character of information sent to the network from an end-user terminal (such as a wireless handset) includes the type of information sent (voice information, video information, file transfer information, network signaling information, etc.); the relative quantity of one type of information in relation to at least one other type (e.g., 50% voice traffic and 50% electronic mail traffic, 35% video traffic, 60% voice-only traffic and 5% file transfer traffic), the compression type(s) of information sent to the network, protocols used for the information, etc. As used herein, "changing the way an end-user terminal sends information to the network" is equivalent to "changing the character of information sent by the end-user terminal to the network."

In one embodiment of the present invention, the network is a wireless network (e.g., operating using the GSM or CDMA protocol), and the end-user terminals are wireless handsets. Examples of a wireless handset include a wireless telephone, a personal information manager (e.g., the Palm Pilot manufactured by the 3Com company of California) that is coupled to the wireless network, and any other appliance coupled to the wireless network. As used herein, the term "coupled" means directly or indirectly connected. Thus, A is coupled to B if A is directly connected to B. Likewise, A is coupled to B if A is directly connected to C and C is directly connected to B. In another embodiment, the end-user terminal can be a personal computer coupled to the wireless network.

Figure 1:
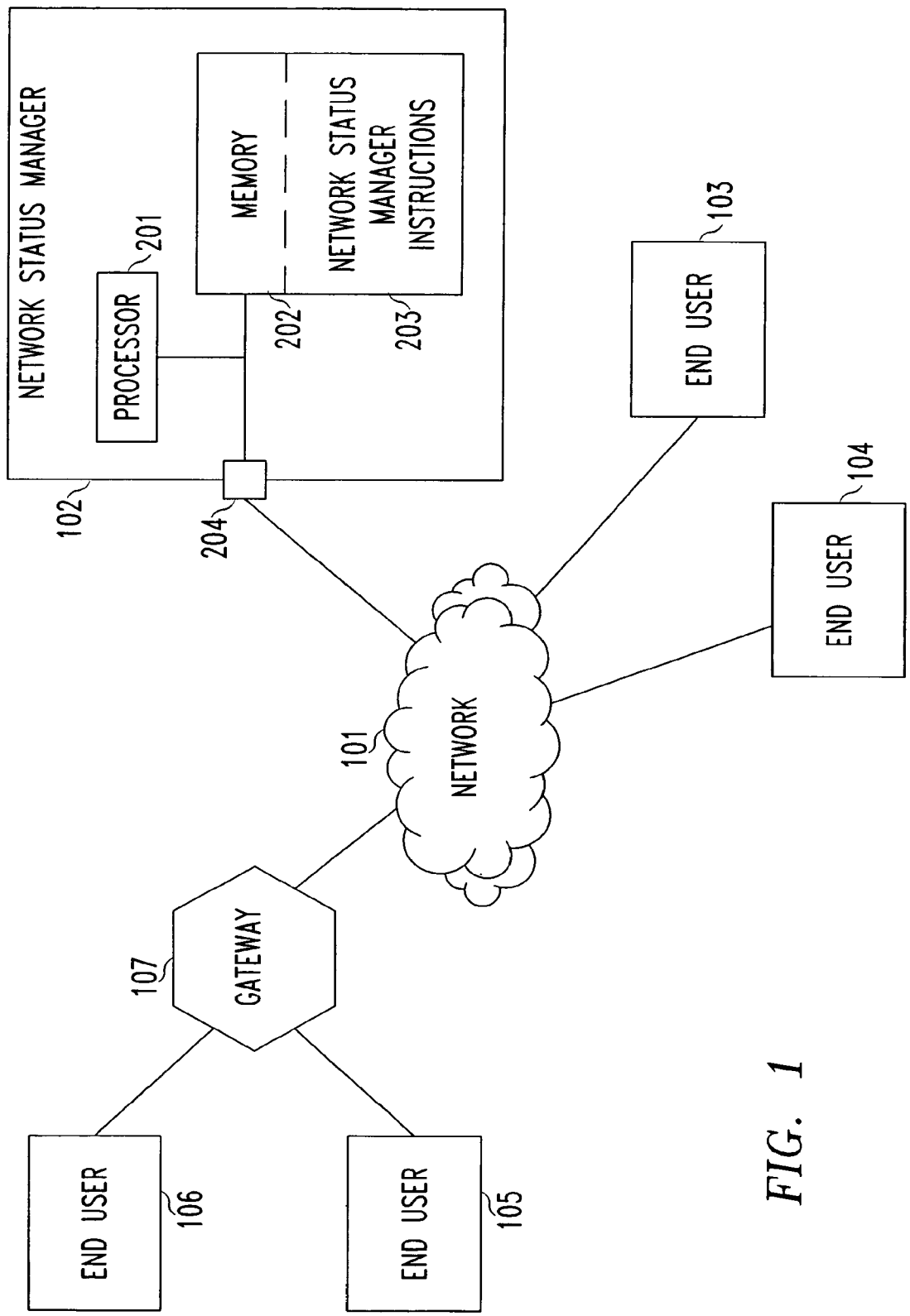
FIG. 1 shows an embodiment of the system and method in accordance with the present invention.

An embodiment of a system in accordance with the present invention is shown in FIG. 1. A wireless network 101 couples a network status manager 102 with end-user terminals 103 and 104. Other end-user terminals 105 and 106 are coupled to the network 101 through a gateway 107. In accordance with an embodiment of the present invention, the network status manager 102 monitors the performance of the network with respect to at least one type of information. The performance measurements by the network status manager 102 can be actual (i.e., the present performance of the network) or prospective (i.e., the projected performance of the network, which can be estimated using stochastic processes known in the art). For example, in one embodiment, the network status manager 102 measures the performance of the network 101 with respect to voice information by measuring the latency (the delay between the sending and receiving) of test voice packets sent by the network status manager 102 to various end-user terminals (e.g., 103, 104) or one or more gateways (e.g., 107) coupled to the network 101. This can be accomplished in one way by utilizing the Unix TRACE command well known in the art, which reports the times between hops by a packet across nodes in a network. Likewise, reporting mechanisms can be set up between end-user terminals (e.g., 103 and 104) and the network status manager. The reporting mechanisms can generate periodic reports pertaining to network performance for one or more types of information based upon observations made at the end-user terminals (103, 104, etc.) These observations can include latency measurements, packet loss rates, etc.

The network status manager 102 monitors the performance of a wireless network with respect to voice (e.g., conversation) information in one embodiment, although the wireless network also carries non-voice information, including e-mail messages, world wide web-information (information exchanged in the course of browsing web sites on the world wide web, such as http requests and web site data), etc. In this embodiment, the voice information (the first type of information) is identified as "preferred information" type by the network status manager 102, and the other types (second types) of information carried by the network are designated "non-preferred" types of information. In this case, this is because delays and errors can have a more disruptive impact on the quality of voice communications than on the exchange of e-mail or world wide web information. For example, when the network becomes congested and a download of e-mail is delayed for a few seconds, a user is typically not substantially inconvenienced. But if a party's voice information is delayed for a few seconds, then the conversation can be substantially disrupted. For example, one isn't sure when the other party has stopped talking, which can lead to talking over the other person. Also, if there is a high error rate in carrying e-mail traffic, the e-mail can simply and quickly be resent until it is received correctly. On the other hand, a high error rate for voice communications can render words or sentences incomprehensible.

In accordance with an embodiment of the present invention, the network status manager identifies a minimum quality of service requirement for the preferred type of information. For example, the"network status manager maintains a maximum latency (delay between the time a piece of data is sent and the time it is received) and a maximum error rate for voice information. If the (current or projected)", performance of the network with respect to the preferred type of information does not meet the quality of service requirements for that type of information, then the network status manager formulates a network status message that it sends to at least one of the end-user terminals. In accordance with an embodiment of the present invention, the network status message is adapted to instruct the end-user terminal to change the way it sends information to the network in order to alleviate whatever problem is causing the network to fall short of the quality of service requirement for the preferred type of information. Thus, for example, if the quality of service requirement for voice traffic in a network is a maximum average latency of no more than 500 milliseconds, and the average latency for voice traffic is determined to be 750 milliseconds, then the network status manager sends a network status message to at least one end-user terminal to correct this situation, i.e., to lower the average voice packet latency to below 500 milliseconds. This can be accomplished in several different ways.

In one embodiment, the network status message instructs the end-user terminal to change the compression scheme it uses for the preferred type of information. For example, the network may be receiving too much voice information to maintain an adequate voice quality of service, so the network status manager formulates a message to end-user terminals to use a more efficient compression scheme for sending voice information to the network. Thus, whereas a first compression scheme sends a second of speech using 5000 bytes of information (a byte is 8 bits, e.g., 10110011), a second compression scheme sends a second of speech using only 2000 bytes. Thus, when the network status manager 102 determines there is too much congestion on the network, the network status manager sends a network status message to handsets coupled to the network to switch from the first compression scheme for voice to the second compression scheme. The more a voice signal is compressed, the worse it typically sounds, so using the more efficient second compression scheme should typically only be mandated when necessary to preserve overall quality of service. A lower quality voice signal may be an acceptable tradeoff in order to prevent excessive delays in receiving fragments of conversation.

In another embodiment of the present invention, the compression scheme of non-preferred information is altered by the receipt of a network status message by an end-user terminal. For example, an end-user terminal is required to use more efficient compression in sending video images to the network. This can advantageously free up bandwidth to maintain a high quality of service for the preferred information type.

In another embodiment of the present invention, the rate at which information is sent to the network is changed by the receipt of the network status message. In one embodiment, the network status message directs an end-user terminal to slow the rate at which it sends non-preferred information (e.g., e-mail information) to the network, so as to free up bandwidth for maintaining the quality of service of preferred information (e.g., voice information). In another embodiment, the network status message directs an end-user terminal to stop sending any new non-preferred information to the network until further notice. In yet another embodiment, the network status message specifies a maximum rate at which non-preferred (and/or preferred) information can be sent to the network. For example, the network status message can instruct the end-user terminal to send file transfer information at a rate no greater than 200 bytes per second.

The network status message is sent as a signal to an end-user terminal, typically (although not necessarily) through the same network whose quality of service is being monitored by the network status monitor 102. In another embodiment, the network status message is sent to the end-user terminal through a second network (not shown). In one embodiment, the network status message signal includes the following:

First Bit: enable/disable transmission of voice information
Second Bit: enable/disable transmission of e-mail information
Third Bit: enable/disable transmission of video information Fourth Bit: enable/disable transmission of http requests
Fifth Bit: enable/disable transmission of ftp requests For example, the signal 11010 enables an end-user terminal to send voice information, e-mail information and http requests to the network, and prohibits the end-user terminal from sending video information and ftp requests to the network.

Another example of a network status signal includes the following:

First-Two Bits: specifies compression scheme for voice information

Second Two Bits: specifies compression scheme for file transfer

Third Two Bits: specifies compression scheme for video information.

Thus, the signal 101100 in accordance with this example specifies compression format 2 for voice (the binary digits 10 are equivalent to the number 2 in the decimal system); compression format 3 for file transfer, and compression format 0 for video information. Each of the compression formats for each of the types of information are advantageously predetermined and known by the handset. Thus, for example, the handset knows that compression format 0 for file transfer is the Kermit data compression format, compression format 1 is the ZIP compression format, etc. Note that one of the compression formats specified in accordance with an embodiment of the present invention is no compression. For example, the compression format 0 for video information in the above example can specify that no compression is to be used for video information sent to the network. This can be advantageous when the clarity of video images is especially important.

Yet another example of a network status message signal includes:

First Four Bits: specifies the rate at which voice information can be sent to the network Second Four Bits: specifies the rate at which e-mail information can be sent to the network Third Four Bits: specifies the rate at which video information can be sent to the network For example, the signal 101110010100 indicates that voice information can be sent at predetermined rate number 11 (11 is the decimal representation of the binary number 1011); e-mail can be sent at the predetermined rate number 9; and video information can be sent at predetermined rate number 4. These rates can be measured differently for each type of information. For example, rate 11 for voice can mean 5000 bytes per second, rate 9 for e-mail can mean 9600 bits per second, and rate 4 for video can mean 8 frames of video information per second. The predetermined rates may also represent maximum rates, thereby permitting the end-user terminal to send the information at a slower rate.

The above examples of network status message signals can be advantageously combined to specify, e.g., the enablement, compression and rate at which one or more types of information can be sent from the end-user terminal to the network.

Another advantageous feature of the present invention is the ability to selectively transmit network status messages only to certain end-user terminals, and to transmit different network status messages to different terminals. This is especially useful when the network is an internetwork (a set of networks coupled to each other), or when the source of network congestion is localized. For example, it may be disadvantageous to limit the transmission of all e-mail to the network from all end-user terminals, or to specify a more efficient voice compression scheme for all end-user terminals when the source of network congestion is originating from a specific subset of terminals. The preferential formulation and/or transmission of network status messages can advantageously be performed by any criterion aimed at solving the problem that jeopardizes the network's capability to meet a quality of service requirement, while at the same time minimizing the negative impact of the network status message (e.g., lowering voice quality by mandating a more efficient voice compression scheme). For example, the network status messages can be formulated and/or sent on the basis of geography (e.g., to all end-user terminal in Minneapolis, to all terminals connected to a given cell in a cellular wireless network, etc.), on network topology (to all terminals connected to a given subnetwork, to al users that utilize a given protocol, to all users with a given area code, etc.), and so on.

For example, a sporting event attended by a large number of persons with cell phones-routinely causes a large amount of voice data to be sent to the network from terminals in the area of the stadium in which the event is held. Without using the network status message in accordance with an embodiment of the present invention, the local part of the network would become congested, resulting in poor voice quality and/or denial of service to many customers. In accordance with an embodiment of the present invention, a network status message is sent only to terminals connected to the part of the network in the stadium (e.g., to the handsets communicating with the cell that serves the stadium) to mandate the most efficient compression scheme for voice, and prohibiting the transmission of any other type of information to the network. The congestion problem is thereby solved without impacting other users whose terminals are not coupled to the stadium part of the network. In this way, the present invention is capable of adjusting the way (compression, rate, etc.) in which information is sent to the network with a minimal adverse impact on the smallest number of customers.

An embodiment of an apparatus (a network status manager) in accordance with the present invention is illustrated in FIG. 1. A processor 201 is coupled to memory 202, which stored network status instructions 203 adapted to be executed by processor 201. Processor 201 in one embodiment is a general purpose microprocessor, such as the Pentium III microprocessor manufactured by the Intel Corporation of Santa Clara, Calif. In another embodiment, processor 201 is an Application Specific Integrated Circuit, which is designed to implement in hardware and firmware at least a part of the method in accordance with an embodiment of the present invention. Memory 202 is any device capable of storing digital information, such as a Random Access Memory, Read Only Memory, flash memory, a hard disk, a read/writable magneto-optical disk, etc. The apparatus shown in FIG. 1 also includes a port 204 adapted to be coupled to a network 1001. Port 204 is coupled to processor 201. Network status manager instructions 203 are adapted to be executed by processor 201 to perform the method in accordance with an embodiment of the present invention, such as the one shown in the flow chart depicted in FIG. 2.

Figure 2:
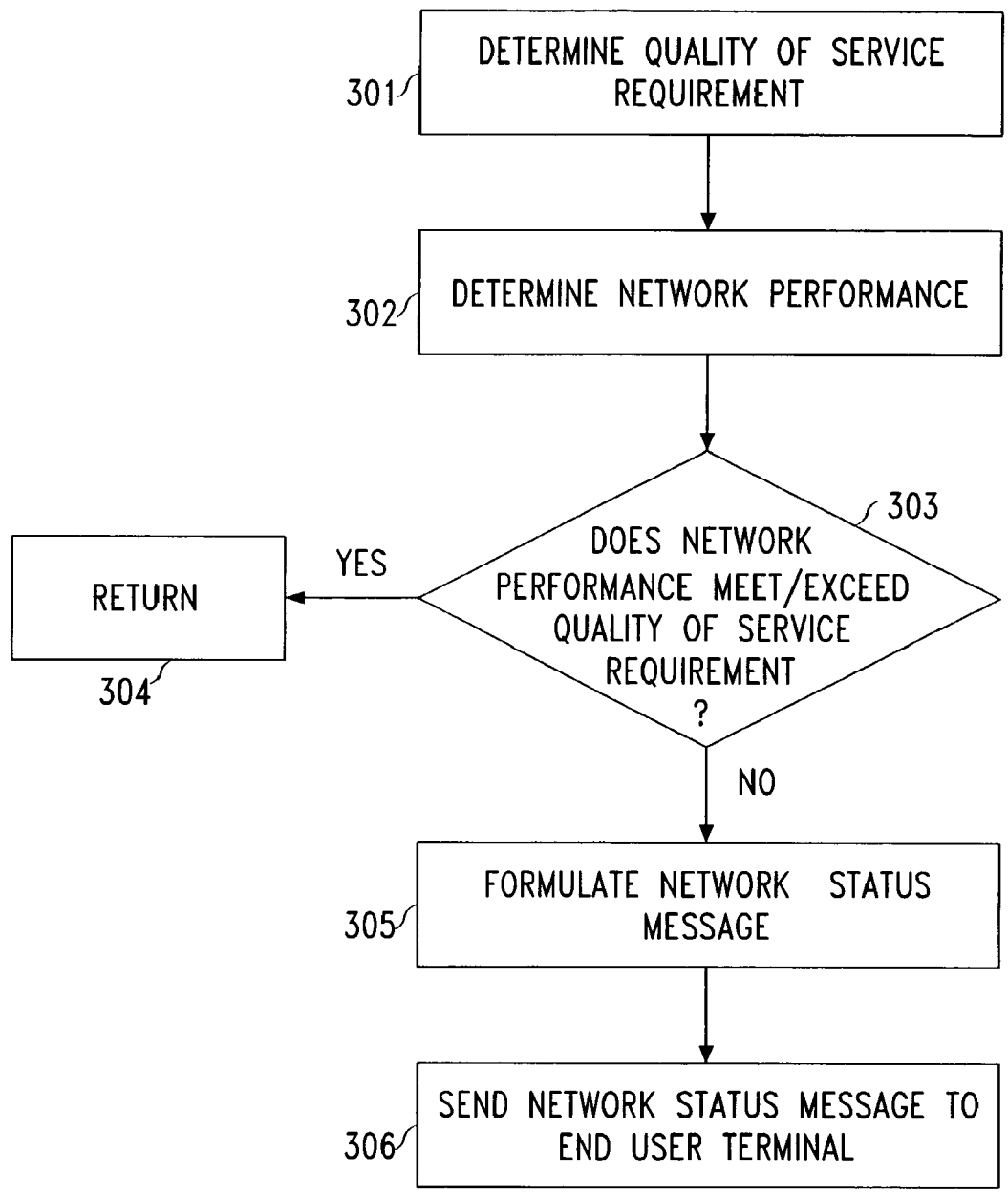
FIG. 2 is a flow chart that illustrates the method in accordance with the present invention.

FIG. 2 is a flow chart showing the method in accordance with an embodiment of the present invention. A quality of service requirement for a type of information carried by the network is determined, 301. Network performance is determined, 302. It is determined if the network performance meets or exceeds the quality of service requirement, 303. If so, then no action is taken, 304. If it is determined that network performance does not meet the quality of service requirement, 303, then a network status message is formulated, 305. The network status message is adapted to be received by an end-user terminal coupled to the network to change the way the terminal sends at least one type of information to the network. The network status message is then sent to an end-user terminal, 305.

The present invention advantageously manages network quality of service by controlling the manner in which end-user terminals are permitted to send information to the network. The embodiments described above are meant to illustrate, and not limit, the scope of the present invention. For example, the first and second types of information need not correspond to "preferred" and "non-preferred" types. The first and second types can bear any relation to each other. Further, the adjustments made as a result of the comparison between the quality of service requirement and performance of the network with respect to a type of information encompass any change in the character (e.g., amount, type, timing of, compression scheme of, encoding of, etc.) any of the various types of information sent to the network. An embodiment of the present invention operates by sending instructions to end-user terminals, such as wireless handsets, computer terminals communicating using wireless telecommunications technology, handheld devices such as personal data managers, etc., to change the way they send information to a network based upon the quality of service requirement and network performance with respect to at least one type of information carried by the network. These and other aspects are encompassed by the present invention, as will be apparent to those skilled in the art.

What is claimed is:

1. An end-user terminal, comprising:
   a processor; and
   a memory coupled to the processor, the memory to store instructions adapted to be executed by the processor to receive a command from a communication network and to switch, in response to the command, from a first compression scheme to a second compression scheme for compression of information to the communication network, the command is sent based on a quality of service level determined by a network status manager associated with the communication network.

2. The terminal of claim 1, wherein the command is to originate from the network status manager.

3. The terminal of claim 2, wherein the command is to identify a type of information that the terminal either is or is not permitted to send to the network.

4. The terminal of claim 2, wherein the network status manager is to generate the command based on a quality of service requirement and a performance of the network.

5. The terminal of claim 1, wherein the second compression scheme is a more efficient compression scheme than the first compression scheme.

6. The terminal of claim 1, wherein the second compression scheme is a less efficient compression scheme than the first compression scheme.

7. The terminal of claim 1, wherein the memory further stores instructions adapted to be executed by the processor to:
   compress specified bits of a bitstream according to the first compression scheme; and
   in response to the command, compress other specified bits of the bitstream according to the second compression scheme.

8. The end-user terminal of claim 1, the quality of service determination is based on an actual performance measurement.

9. The end-user terminal of claim 1, the quality of service determination is based on a prospective performance measurement.

10. The end-user terminal of claim 1, the command directs the end-user terminal to decrease the rate at which information is sent from the end-user terminal to the network.

11. The end-user terminal of claim 1, the command specifies a maximum rate at which information can be sent from the end-user terminal to the network.

12. A wireless end-user terminal in a communication network, comprising:
   a processor in the wireless end-user terminal; and
   a memory coupled to the processor, the memory to store instructions adapted to be executed by the processor to receive a command over the communication network indicating to the processor to switch from a first compression scheme to a second compression scheme for compression of data communicated over the communication network, the command is sent based on a quality of service level determined by a network status manager associated with the communication network.

13. The wireless end-user terminal of claim 12, wherein the command originates from the network status manager.

14. The terminal of claim 13, wherein the network status manager generates the command based on a quality of service requirement of communications over the communication network and a data delivery performance of the communication network.

15. The terminal of claim 12, wherein the command identifies a type of information that the wireless end-user terminal either is or is not permitted to send to the communication network.

16. The terminal of claim 10, wherein the second compression scheme is a more efficient compression scheme than the first compression scheme.

17. The terminal of claim 12, wherein the second compression scheme is a less efficient compression scheme than the first compression scheme.

18. The terminal of claim 12, wherein the memory further stores instructions adapted to be executed by the processor, the instructions causing the processor to:
   compress specified bits of a bitstream according to the first compression scheme; and
   in response to the command received over the communication network, compress other specified bits of the bitstream according to the second compression scheme.

19. A wireless end-user terminal in a communication network, comprising:
   a processor in the wireless end-user terminal; and
   a memory coupled to the processor, the memory to store instructions adapted to be executed by the processor to receive a command over the communication network from a network status manager connected to the communication network, the command indicating to the processor to switch from compressing data using a first compression scheme to a second compression scheme, the command is sent based on a quality of service level determined by the network status manager.

20. A wireless end-user terminal in a communication network, comprising:
   a processor in the wireless end-user terminal; and
   a memory coupled to the processor, the memory to store instructions adapted to be executed by the processor to receive commands over the communication network from a network status manager connected to the communication network, the commands indicating to the processor to switch from compressing data using a first compression scheme to a second compression scheme and identifying a type of information that the local end-user terminal either is or is not permitted to send to the communication network, the commands are sent based on one or more quality of service levels determined by the network status manager.

21. A method, comprising:

receiving a command from a communication network based on a quality of service level determined by a network status manager associated with the communication network; and switching, in response to the command, from a first compression scheme to a second compression scheme for compression of information to the communication network.

* * * * *